(No Model.)
E. J. YARBROUGH & J. M. KYKER.
ANIMAL POWER.
No. 321,876. Patented July 7, 1885.
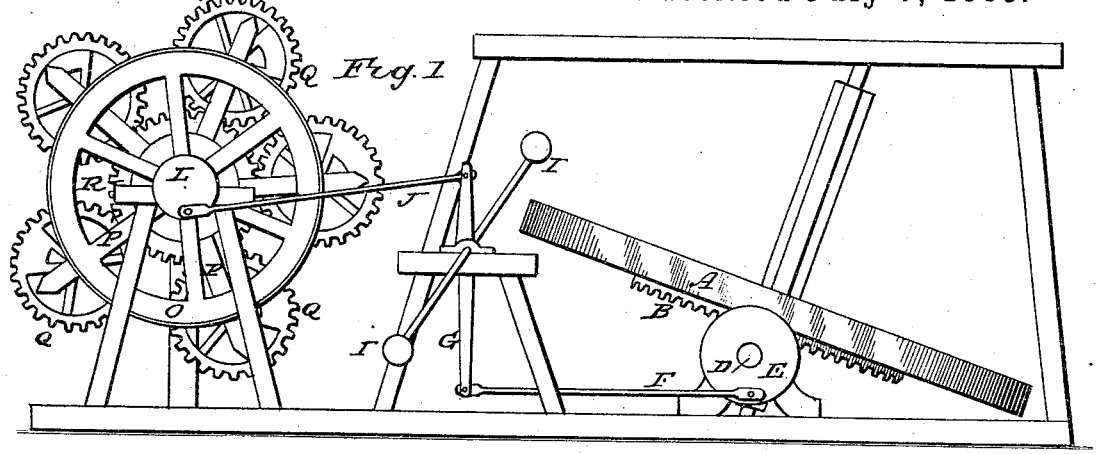
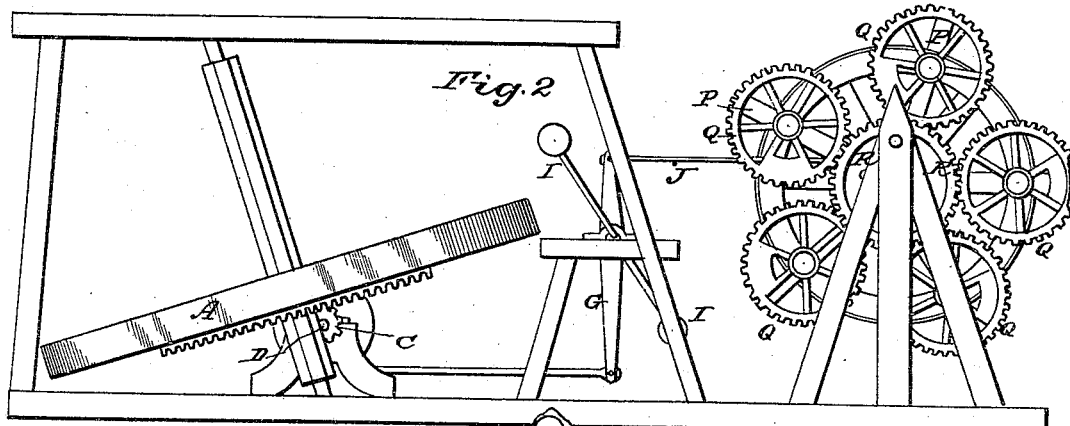
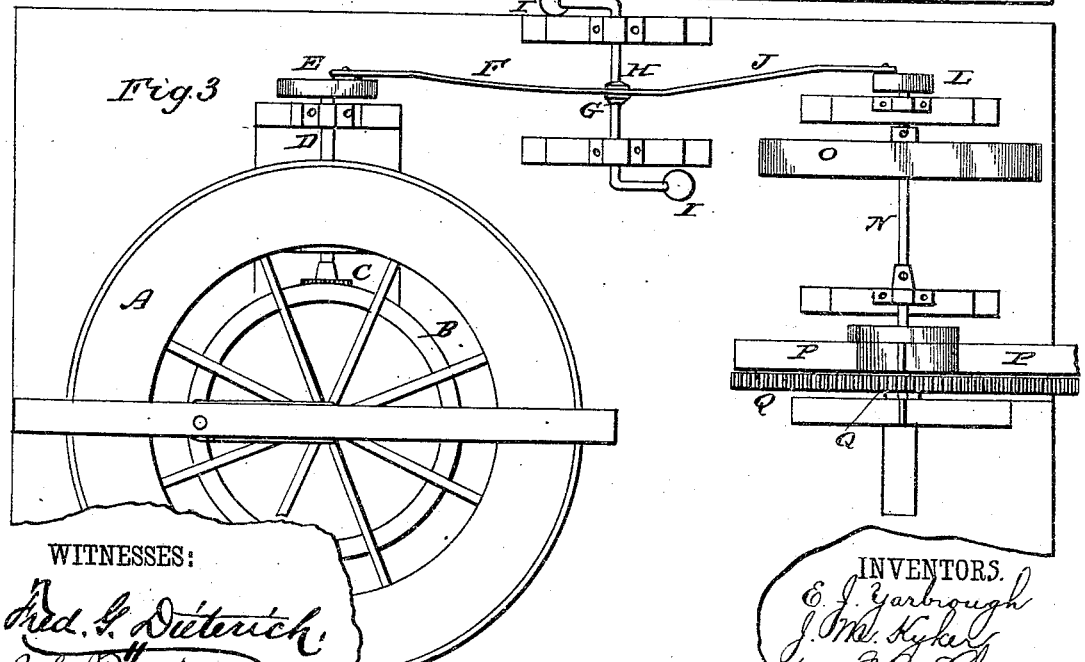
WITNESSES:
Fred. G. Dieterich
J. E. Prosperi
INVENTORS.
E. J. Yarbrough
J. M. Kyker
per F. A. Lehmann
ATTORNEY.

UNITED STATES PATENT OFFICE.

EZEKEL JAMES YARBROUGH AND JOHN MARSHAL KYKER, OF BURNS CITY, TEXAS.

ANIMAL-POWER.

SPECIFICATION forming part of Letters Patent No. 321,876, dated July 7, 1885.

Application filed December 17, 1884. (No model.)

*To all whom it may concern:*

Be it known that we, EZEKEL JAS. YARBROUGH and JNO. MARSHAL KYKER, of Burns City, in the county of Cooke and State of Texas, have invented certain new and useful Improvements in Animal-Powers; and we do hereby declare the following to be a full, clear, and exact description of the invention, such as will enable others skilled in the art to which it pertains to make and use it, reference being had to the accompanying drawings, which form part of this specification.

Our invention relates to an improvement in animal-powers; and it consists in the combination of the tread-wheel on which the animal is placed, and which is provided with a cog-wheel on its under side to mesh with a pinion placed on one end of the crank-shaft, a connecting-rod which is attached at one end to the crank and at the other to a pivoted lever, which is provided with weighted arms, a second connecting-rod which is fastened to the upper end of the pivoted lever at one end and to a crank upon the main driving-shaft at the other, a balance-wheel, and the main driving-shaft provided with a number of arms, each one of which carries a planet-wheel for the purpose of moving around a fixed wheel, all of which will be more fully described hereinafter.

The object of our invention is to use, in connection with the animal-wheel, weighted levers and a series of planet-wheels for the purpose of enabling a comparatively light weight upon the wheel to accomplish a greater amount of work than can be done by the animal-powers heretofore employed.

Figures 1 and 2 are side elevations of a machine embodying our invention, taken from opposite sides. Fig. 3 is a plan view of the same.

A represents a wheel of suitable diameter, and which is set at an angle in the usual manner, and upon which one or more animals of any kind are placed for the purpose of causing the weight of the animal or animals to operate the machinery connected with the wheel. On the under side of the wheel A is a crown-wheel, B, which meshes with the pinion C, placed upon one end of the shaft D. Upon the other end of the shaft D is placed a crank-wheel, E, to which one end of the connecting-rod F is fastened. The opposite end of the connecting-rod F is fastened to the lower end of the pivoted lever G. This lever G is rigidly fastened to the partially-rotating shaft H, which has its ends turned in opposite directions, and loaded with the heavy balls or weights I. As the lever is made to rock by the action of the crank-wheel and connecting-rod, the partially-rotating weighted shaft is also caused to rock correspondingly. The weights upon the ends of this shaft serve to act as levers, and add momentum to the moving parts. To the other end of the rocking-lever is fastened one end of the connecting-rod J, the opposite end of which rod is connected to and communicates power through the crank-wheel L to the driving-shaft N. On this shaft N is placed a large fly-wheel, O, over which a belt may be passed for communicating the power to any machine which may be driven. Also, secured to the driving-shaft are a number of arms, P, upon each one of which is journaled a planet-wheel, Q.

All these planet-wheels mesh with a stationary gear-wheel, R, as the planet-wheels revolve around it. These planet-wheels, in connection with the weighted semi-rotating shaft, add greatly to the momentum of the moving parts, and thus enables a much greater power to be produced by the movement of the animal-wheel than could be done if these parts were not used.

It is not necessary that the wheel A should be driven by animal-power alone, for instead of the animal-wheel, a water-wheel or any other suitable motor may be substituted.

We do not limit ourselves to the use of the animal-wheel alone, for any other motor will answer equally as well.

Having thus described our invention, we claim—

The combination of a driving wheel or power, the horizontal shaft B, provided with a crank-wheel upon one end, two connecting-rods which are attached to opposite ends of the rocking lever placed upon a semi-rotating shaft, a driving-shaft, a fly-wheel, a series of planet-wheels, and a stationary wheel, all being combined and arranged to operate, substantially as shown and described.

In testimony whereof we affix our signatures in presence of two witnesses:

EZEKEL JAMES YARBROUGH.
JOHN MARSHAL KYKER.

Witnesses:
R. E. L. SEVIER,
J. R. WALKER.